Patented June 16, 1942

2,286,543

UNITED STATES PATENT OFFICE 2,286,543

PROCESS OF ALKYLATING HYDROCARBONS

Heinz Heinemann, Pittsburgh, Pa., assignor to the firm Danciger Oil & Refineries, Inc., Tulsa, Okla.

No Drawing. Application July 10, 1941,
Serial No. 401,788

18 Claims. (Cl. 196—10)

This invention relates to a catalytic process of alkylating hydrocarbons and it has particular relation to a process of alkylating iso-paraffins with olefins.

The known processes of alkylating iso-paraffins with an olefin are catalytic and noncatalytic in nature. The noncatalytic processes require very high temperatures and pressures. In the catalytic processes the catalysts used in the main, are sulfuric acid and aluminum chloride, with or without activators. Phosphoric acid preparations have appeared in the literature recently for the purpose of alkylation.

It has been found that the process of alkylating iso-paraffins with olefins, such as ethylene, propylene, butylene, and their homologues, can be carried out with particular advantage by causing the reaction components to react at an elevated temperature and under superatmospheric pressure in the presence of a catalyst which contains as active ingredients a metal halide selected from the group consisting of the halides of zinc, aluminum, iron, and tin, particularly zinc chloride, aluminum chloride, ferric chloride, stannic chloride, and, as an activator or promoter, an oxygen containing compound of antimony selected from the group consisting of antimony compounds obtained by hydrolytic decomposition in aqueous solution, of a water-soluble compound of antimony, oxides and oxide hydrates of antimony, oxy-acids of antimony, and antimony compounds obtained by acidifying an aqueous solution of an antimonic salt. The metal halide antimony compound mixture of the type described may consist of one or more metal halides together with one or more antimony compounds referred to. In the catalytic composition used for carrying out the process of this invention, the metal halide may be present wholly or partly dissolved in water. A saturated metal halide solution which contains an undissolved excess of the metal halide may, for example, be used.

The above mentioned antimony compounds may be prepared in any suitable manner. I prefer, for instance, the treatment with water of antimony pentachloride, antimony pentafluoride, antimony pentachloride hydrate or hydrochloric acid solution of antimony pentachloride, or the decomposition of an aqueous solution of a salt of an antimonic acid with an acid. A single compound of antimony or a mixture of several compounds may be used. Suitable antimony compounds are, for example, $Sb_2O_5 \cdot H_2O$, $Sb_2O_5 \cdot 2H_2O$, $Sb_2O_5 \cdot 3H_2O$, or the precipitates obtained by acidifying the aqueous solution of a salt of an antimonic acid, such as a salt of $H_3SbO_4$, $H_4Sb_2O_7$, or $HSbO_3$.

For instance, 1 part by weight of antimony pentachloride is added gradually to about an equal weight of water. This causes the formation of a white precipitate which probably consists of hydrates of antimony pentoxide. This product, however, may contain, besides the hydrates of antimony pentoxide, hydrolysis products of antimony trichloride. The presence of compounds of trivalent antimony may be surmised because of the detection by odor of chlorine evolved during the reaction between the water and antimony pentachloride. The white precipitate is brought upon a filter and washed with water until the filtrate is substantially free from chlorine ion, and added under agitation to a 10% solution of zinc chloride in water. The antimony precipitate obtained from 2 to 5 parts by weight of antimony pentachloride, may be added to about 1000 parts by weight of a 10% aqueous solution of zinc chloride, for example.

Solid carriers, such as silica-gel, diatomaceous earth, kieselguhr, bentonite, activated carbon, fuller's earth or alumina, may also be employed in the preparation of the catalyst used in the process of the present invention. For example, 30 grams of zinc chloride are dissolved in 20 cc. of water and homogenized with a suspension of 1 gram of antimony compound suspended in 10 cc. of water, said antimony compound being obtained as described above by the action of water on antimony pentachloride. The mixture of zinc chloride solution and antimony compound is added in portions to 185 grams of activated alumina, and agitated rapidly until the mixture is dry.

The catalytic compositions of the above described type are substantially non-corrosive, and they can be used for a relatively long time without substantial reduction of their efficiency. A further advantage afforded by the use of the catalyst and process described is that it will alkylate iso-paraffins with any olefin including ethylene. This is not the case with catalysts heretofore known.

The invention may be illustrated by the following examples:

*Example I.*—A mixture consisting of 66⅔% by volume of ethylene and 33⅓% by volume of isobutane, is heated in a reaction chamber at 400° F. under a gauge pressure of 400 lbs. per square inch for a period of one hour, in the presence of a catalyst consisting of 900 parts of water, 96 parts of zinc chloride and the product of hydrolysis of 4 parts of antimony pentachloride. The reaction product separated from the catalyst, contained, besides the excess ethylene and the unused iso-butane, some liquid, amounting to a calculated yield of 70% by weight, based upon the iso-butane charge to the reaction. The catalyst, after separation from the reaction mixture, is available for the reaction between further quantities of ethylene and iso-butane.

The product from the alkylation of iso-butane with ethylene, under the conditions given, had an octane number of 91, and contained a considerable proportion of neohexane.

The process may also be carried out in continuous operation, the details of such continuous process and the necessary modifications of the above described procedure being obvious to those skilled in the art.

The ratio of the antimony compound to the metal halide is of great importance to the conversion, as is illustrated in the following table, showing in the first two columns the weight in grams of zinc chloride, and of the antimony penta-chloride used for the preparation of the activator, that was added to 900 cc. of water, to form the catalyst, and in the last column the percent conversion to alkylate (based upon the isobutane charge to the reaction vessel) after heating the reaction mixture at 400° F. under a pressure of 400 lbs. per square inch for a period of an hour:

| Weight ZnCl₂ | Weight SbCl₅ | Conversion |
|---|---|---|
| | | Per cent |
| 98 | 2 | 47 |
| 97 | 3 | 72 |
| 96 | 4 | 70 |
| 95 | 5 | 52 |

*Example II.*—A mixture of 30 parts by weight of zinc chloride, 30 parts of water, and one part of antimony compound were well mixed with 185 parts of activated alumina. A mixture of 1.7 parts by volume of iso-butane and 1.0 parts by volume of butylene, said butylene being prepared by the dehydration of normal butyl alcohol over alumina at 850° F., was maintained at a temperature of 400° F. and a pressure of 445 lbs. per square inch, in the presence of the above catalyst for a period of 65 minutes, this period of time being taken to attain the reaction temperature. The yield of alkylate amounted to 41.5% of the theoretical and the alkylate had an octane blending value of 90. In the presence of 3 cc. of tetraethyl lead per gallon of blend, its octane blending value was 92, showing that it had both a high octane number and a high lead susceptibility.

In carrying out the present invention, the ratio of iso-paraffins to the olefin may vary within wide limits from an excess of the paraffin to an excess of the olefin.

Under similar conditions a similar catalyst causes polymerization of butylene when no iso-butane is present. The reaction velocity of the polymerization, however, is probably lower than that of alkylation, and, therefore, alkylation would prevail when iso-butane is present. When under similar conditions no antimony compound is present in the catalyst, some alkylation takes place, but its extent is quite small.

Alkylation of iso-paraffins with olefins can be effected at temperatures between 300° and 1000° F., depending on the pressure used, which varies between 200 and 1000 pounds or more per square inch. I prefer the use of temperatures between 300° and 500° F. and the use of a pressure of 300 to 450 lbs. per square inch.

The reaction between iso-paraffins and olefins according to this invention may be carried out in the presence of impurities or other compounds which do not adversely affect the alkylation. For example, the iso-butane present in hydrocarbon gas mixtures may be utilized in the process of this invention, or iso-paraffins and olefins, which are obtained in cracking may be subjected to reaction conditions in the presence of the catalyst. The iso-paraffins and olefins may also be used in pure condition.

The above examples are given merely for purposes of illustration. Various modifications are possible and will be apparent. Other modifications and changes may be made by those skilled in the art without departing from the nature and scope of the invention as defined in the appended claims.

Reference is made to my co-pending application Serial No. 370,738, filed December 19, 1940.

I claim:

1. A process of alkylating iso-paraffins with olefins, said process comprising reacting an iso-paraffin with an olefin at a temperature of 300° to 500° F. and under a pressure of 300 to 450 lbs. per square inch, in the presence of a catalytic composition containing a metal halide selected from the group consisting of zinc halides, aluminum halides, ferric halides, and stannic halides, in mixture with an oxygen containing compound of antimony selected from the group consisting of antimony compounds obtained by hydrolytic decomposition in aqueous solution, of a water-soluble compound of antimony, oxides and oxide hydrates of antimony, oxy-acids of antimony, and antimony compounds obtained by acidifying an aqueous solution of a salt of an antimonic acid.

2. A process of alkylating iso-paraffins with olefins, said process comprising reacting an iso-paraffin with an olefin at a temperature of 300° to 500° F. and under a pressure of 300 to 450 lbs. per square inch, in the presence of a catalytic composition containing a metal halide selected from the group consisting of zinc halides, aluminum halides, ferric halides, and stannic halides, said metal halide being at least partly dissolved in water, in mixture with an oxygen containing compound of antimony selected from the group consisting of antimony compounds obtained by hydrolytic decomposition in aqueous solution, of a water-soluble compound of antimony, oxides and oxide hydrates of antimony, oxy-acids of antimony, and antimony compounds obtained by acidifying an aqueous solution of a salt of an antimonic acid.

3. A process of alkylating iso-paraffins with olefins, said process comprising reacting an iso-paraffin with an olefin at a temperature of 300° to 500° F., and under a pressure of 300 to 450 lbs. per square inch, in the presence of a catalytic composition containing a solid carrier substance, and a metal halide selected from the group consisting of zinc halides, aluminum halides, ferric halides and stannic halides, in mixture with an oxygen containing compound of antimony selected from the group consisting of antimony compounds obtained by hydrolytic decomposition in aqueous solution, of a water-soluble compound of antimony, oxides and oxide hydrates of antimony, oxy-acids of antimony, and antimony compounds obtained by acidifying an aqueous solution of a salt of an antimonic acid.

4. A process of alkylating iso-paraffins with olefins, said process comprising reacting an iso-paraffin with an olefin, at a temperature of 300° to 500° F. and under a pressure of 300 to 450 lbs. per square inch, in the presence of a catalytic composition containing zinc chloride and a precipitate obtained by the action of water on about an equal amount of antimony pentachloride.

5. A process of alkylating iso-paraffins with olefins, said process comprising reacting an iso-paraffin with an olefin at a temperature of 300° to 500° F. and under a pressure of 300 to 450 lbs. per square inch, in the presence of a catalytic composition containing zinc chloride, which is at least partially dissolved in water and a precipitate obtained by the action of water on about an equal amount of antimony pentachloride.

6. A process of alkylating iso-paraffins with olefins, said process comprising reacting an iso-paraffin with an olefin at a temperature of 300° to 500° F., and under a pressure of 300 to 450 lbs. per square inch, in the presence of a catalytic composition containing a solid carrier substance, zinc chloride, and a precipitate obtained by the action of water on about an equal amount of antimony pentachloride.

7. A process of alkylating iso-butane with ethylene, said process comprising reacting said iso-butane with ethylene, at a temperature of about 400° F. and under a pressure of 400 to 450 lbs. per square inch, in the presence of a catalytic composition containing a metal halide selected from the group consisting of zinc halides, aluminum halides, ferric halides and stannic halides, in mixture with an oxygen containing compound of antimony selected from the group consisting of antimony compounds obtained by hydrolytic decomposition in aqueous solution, of a water-soluble compound of antimony, oxides and oxide hydrates of antimony, oxy-acids of antimony, and antimony compounds obtained by acidifying an aqueous solution of a salt of an antimonic acid.

8. A process of alkylating iso-butane with ethylene, said process comprising reacting said iso-butane with ethylene at a temperature of about 400° F. and under a pressure of 400 to 450 lbs. per square inch, in the presence of a catalytic composition containing zinc chloride and an oxygen containing compound of antimony selected from the group consisting of antimony compounds obtained by hydrolytic decomposition in aqueous solution, of a water-soluble compound of antimony, oxides and oxide hydrates of antimony, oxy-acids of antimony, and antimony compounds obtained by acidifying an aqueous solution of a salt of an antimonic acid.

9. A process of alkylating iso-butane with ethylene, said process comprising reacting said iso-butane with ethylene at a temperature of about 400° F., and under a pressure of 400 to 450 lbs. per square inch, in the presence of a catalytic composition consisting of 96 parts b. w. of zinc chloride dissolved in 900 parts b. w. of water and the product of hydrolysis of 2 to 5 parts b. w. of water on about an equal amount of antimony pentachloride.

10. A process of alkylating iso-butane with butylene, said process comprising reacting said iso-butane with butylene at a temperature of about 400° F. and under a pressure of 400 to 450 lbs. per square inch, in the presence of a catalytic composition containing a metal halide selected from the group consisting of zinc halides, aluminum halides, ferric halides and stannic halides, in mixture with an oxygen containing compound of antimony selected from the group consisting of antimony compounds obtained by hydrolytic decomposition in aqueous solution, of a water-soluble compound of antimony, oxides and oxide hydrates of antimony, oxy-acids of antimony, and antimony compounds obtained by acidifying an aqueous solution of a salt of an antimonic acid.

11. A process of alkylating iso-butane with butylene, said process comprising reacting said iso-butane with butylene at a temperature of about 400° F. and under a pressure of 400 to 450 lbs. per square inch, in the presence of a catalytic composition containing zinc chloride and an oxygen containing compound of antimony selected from the group consisting of antimony compounds obtained by hydrolytic decomposition in aqueous solution, of a water-soluble compound of antimony, oxides and oxide hydrates of antimony, oxy-acids of antimony, and antimony compounds obtained by acidifying an aqueous solution of a salt of an antimonic acid.

12. A process of alkylating iso-butane with butylene, said process comprising reacting said iso-butane with butylene at a temperature of about 400° F. and under a pressure of 400 to 450 lbs. per square inch, in the presence of a catalytic composition consisting of 96 parts b. w. of zinc chloride dissolved in 900 parts b. w. of water and the product of hydrolysis of 2 to 5 parts b. w. of water on about an equal amount of antimony pentachloride.

13. A process of alkylating iso-butane with ethylene, said process comprising reacting said iso-butane with ethylene at a temperature of about 400° F. and under a pressure of 400 to 450 lbs. per square inch, in the presence of a catalytic composition consisting of a mixture of about 30 parts by weight of zinc chloride, about 30 parts b. w. of water, 1 to 2 parts of antimony compounds obtained by hydrolytic action of water on about an equal amount of antimony pentachloride, and 185 parts by weight of activated alumina.

14. A process of alkylating iso-butane with butylene, said process comprising reacting said iso-butane with butylene at a temperature of about 400° F. and under a pressure of 400 to 450 lbs. per square inch, in the presence of a catalytic composition consisting of a mixture of about 30 parts b. w. of zinc chloride, about 30 parts b. w. of water, 1 to 2 parts of antimony compounds obtained by hydrolytic action of water on about an equal amount of antimony pentachloride, and 185 parts by weight of activated alumina.

15. In a process of alkylating iso-paraffins with olefins, the step of bringing the reaction mixture of an iso-paraffin and an olefin into contact with a catalyst containing a metal halide, selected from the group consisting of zinc halides, aluminum halides, ferric halides and stannic halides, in mixture with an oxygen containing compound of antimony selected from the group consisting of antimony compounds obtained by hydrolytic decomposition in aqueous solution, of a water-soluble compound of antimony, oxides and oxide hydrates of antimony, oxy-acids of antimony, and antimony compounds obtained by acidifying an aqueous solution of a salt of an antimonic acid.

16. In a process of alkylating iso-paraffins with olefins, the step of bringing the reaction mixture of an iso-paraffin and an olefin into contact with a catalyst containing zinc chloride and the product of hydrolysis of water on about an equal amount of antimony pentachloride.

17. In a process of alkylating iso-paraffins with olefins, the step of bringing a mixture of an iso-paraffin with an olefin and other hydrocarbons into contact with a catalyst containing a metal halide selected from the group consisting of zinc halides, aluminum halides, ferric halides and stannic halides in mixture with an oxygen containing compound of antimony selected from the group consisting of antimony compounds obtained by hydrolytic decomposition in aqueous solution, of a water-soluble compound of antimony, oxides and oxide hydrates of antimony, oxy-acids of antimony, and antimony compounds obtained by acidifying an aqueous solution of a salt of an antimonic acid.

18. In a process of alkylating iso-paraffins with olefins, the step of bringing a mixture of an iso-paraffin with an olefin and other hydrocarbons into contact with a catalyst containing zinc chloride and the product of hydrolysis of water on about an equal amount of antimony pentachloride.

HEINZ HEINEMANN.